United States Patent [19]
Prisk

[11] 3,730,224
[45] May 1, 1973

[54] OUTLET VALVE FOR LIQUID SUPPLY RECEPTACLE

[75] Inventor: Orford W. Prisk, San Gabriel, Calif.

[73] Assignee: Martin Weber, Alhambra, Calif.

[22] Filed: Dec. 23, 1970

[21] Appl. No.: 101,042

[52] U.S. Cl. ............ 137/625.33, 251/144, 251/322, 251/323, 251/118, 222/564
[51] Int. Cl. ........................... F16k 1/32, F15d 1/10
[58] Field of Search ............... 251/322, 323, 335 A, 251/321, 144, 118; 239/583, 435; 222/518, 564; 137/625.33

[56] References Cited

UNITED STATES PATENTS

| 2,623,785 | 12/1952 | Henchert | 251/323 X |
| 3,584,834 | 6/1971 | Reid | 251/335 A |
| 2,574,036 | 11/1951 | Henchert | 251/322 |

FOREIGN PATENTS OR APPLICATIONS

| 678,386 | 9/1952 | Great Britain | 251/323 |

*Primary Examiner*—Arnold Rosenthal
*Attorney*—White, Haefliger and Bachand

[57] ABSTRACT

A valve assembly includes:

a. a valve body having a side inlet and a bottom outlet, there being a downwardly facing annular seat in the body through which fluid passes in flowing to the outlet, b. a stopper upwardly engagable against the seat and a stem carrying the stopper and projecting upwardly in the body, c. yieldable means urging the stem upwardly, and d. a device sealing off over the body proximate the stem upper terminal and having a flexible upper portion exposed upwardly and projecting over the stem upper terminal, whereby said terminal may be depressed through said device to urge the stem and stopper downwardly for opening the valve.

8 Claims, 4 Drawing Figures

Patented May 1, 1973
3,730,224
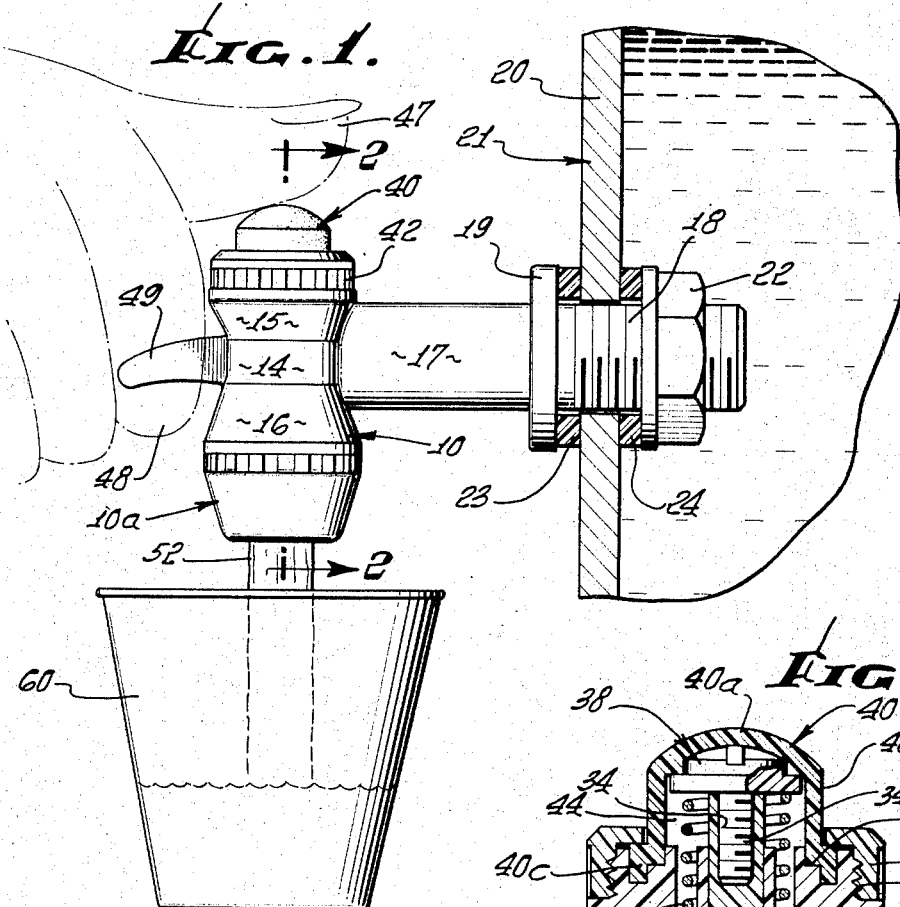
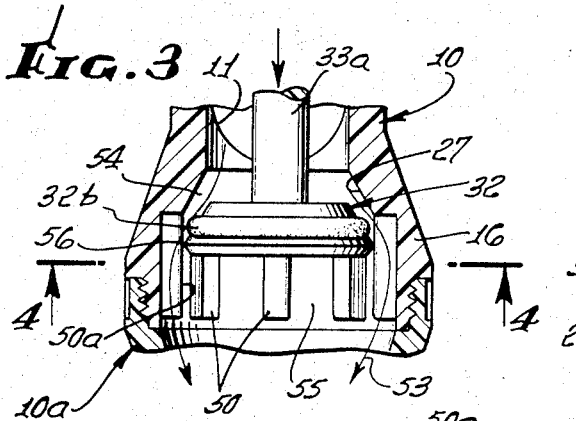
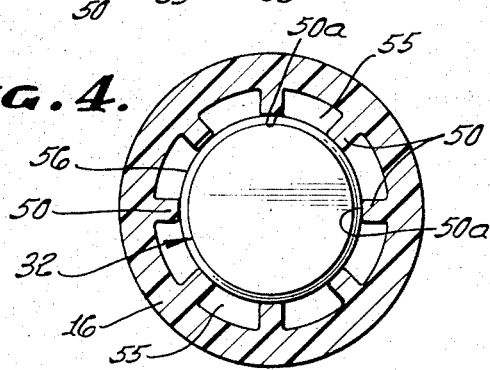
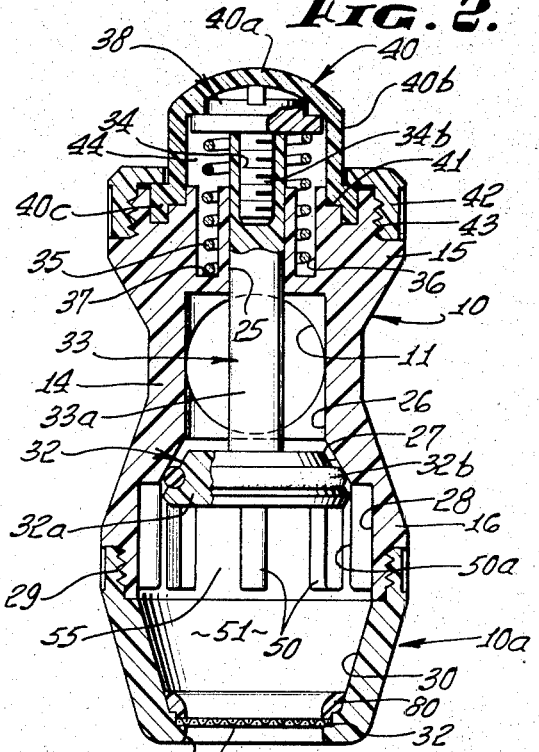
INVENTOR.
ORFORD W. PRISK
By
White, Haefliger & Bachand
ATTORNEYS.

3,730,224

OUTLET VALVE FOR LIQUID SUPPLY RECEPTACLE

BACKGROUND OF THE INVENTION

This invention relates generally to spigot type valves, and more particularly concerns improvements in the construction and functioning of valves adapted for use in controlling the outlets of drinking water containers.

The control of water delivery from containers such as coolers should be such as to provide an even, downward and open flow of water which is not laterally deflected or splashed, in order to enable quick, positive filling of a drinking cup. In addition, the control valve should not leak, be of simple construction, and the stopper should be accurately and easily movable upwardly and downwardly in centered relation to an outlet port so as to provide for the desired discharge flow. Prior flow controls or valves have not, to my knowledge, been capable of meeting all of the above requirements, nor have they been characterized by additional unusual features of construction as well as advantageous mode of operation and results found in the present valve, as will be seen.

SUMMARY OF THE INVENTION

It is a major object of the invention to provide a valve assembly characterized as meeting the above requirements and as overcoming problems associated with prior valves adapted for controlling the discharge from drinking water containers. Basically, the valve assembly comprises a valve body having a side inlet and a bottom outlet, there being a downward facing annular seat in the body and through which water or other fluid passes in flowing to the outlet; a stopper upwardly engagable against the seat and a stem carrying the stopper and projecting upwardly in the body; yieldable means urging the stem upwardly; and a device sealing off over the body proximate the stem upper terminal and having a flexible upper portion exposed upwardly and projecting over the stem upper terminal, whereby the latter may be depressed to urge the stem and stopper downwardly for opening the valve. As will be seen, the sealing device may have the form of a cap projecting upwardly through an annular retainer on the body which retains the cap to the body, the retainer and cap cooperating in such manner that the cap is presented as a pushbutton easily depressed by the user's thumb. In this regard, the cap may consist of a flexible plastic material such as vinyl polymer, and the body may consist of a rigid molded plastic material.

Other objects and advantages of the invention include the provision of flow guides projecting in a flow chamber between the stopper and outlet to guide draining water into a vertical, non splashing discharge stream issuing from the outlet; the location of such flow guides to center the stopper during its vertical displacement in the flow chamber below the seat, and the provision for vertical adjustability of stem upper and lower sections to control stopper displacement from the seat, thereby to control the amount of depression of the push-button-seal needed to open the spigot to desired extent.

These and other objects and advantages of the invention, as well as the details of an illustrative embodiment, will be more fully understood from the following description and drawings.

DRAWING DESCRIPTION

FIG. 1 is an elevation showing use of a valve incorporating the invention;

FIG. 2 is an enlarged vertical section taken on lines 2—2 of FIG. 1, the valve being closed;

FIG. 3 is a fragmentary elevation showing the FIG. 2 valve in open condition; and FIG. 4 is a horizontal section taken on lines 4—4 of FIG. 3.

DETAILED DESCRIPTION

In the drawings a valve body 10 has a side inlet 11 and a bottom outlet 12, there being a downwardly facing annular seat 27 in the body through which fluid passes in flowing to the outlet. In this regard, the body may have generally tubular, rigid plastic construction, with a reduced mid-portion 14 and enlarged upper and lower portions 15 and 16. Integrally molded with the body is a sidewardly extending inlet duct 17 carrying threaded terminal extent 18 and a flange at 19. The latter facilitate connection to the wall 20 of a fluid or liquid (such as drinking water) container 21, as by means of a nut 22 threaded on terminal extent 18; for example, a sealing washer 23 is compressively retained between flange 19 and wall 20, and another sealing washer 24 is compressively retained between nut 22 and wall 20, as shown.

Body 10 may typically contain a central vertical bore 25, a counterbore 26, an annular tapered seat 27 and counterbore 28. A lower body section 10a may have thread connection at 29 with the main body 10, and be internally downwardly tapered at 30 toward outlet 12. A particle trap such as screen 31 is suitably attached at 32 to the section 10a to extend across the outlet.

A stopper, as for example is shown at 32, is upwardly engagable against the seat 27, the stopper for example including a molded plastic plug 32a and an elastomer O-ring 32b, the latter positively sealing off against the seat. An integral plastic stem 33 carries the plug 32a and projects upwardly in the body 10 and through counterbore 26 and bore 25 with sufficient clearance to allow free up and down movement. The stem may advantageously comprise lower and upper sections 33a and 33b, having threaded interengagement as at 34 so that the stem length may be adjusted to control the extent of stopper displacement away from the seat, as will appear.

Yieldable means to urge the stem upwardly may comprise a compression spring 35, the lower end of which is received into an annular recess 36 in the body upper portion 15, to seat at 37. The upper end of the spring engages the underside of a stem head 38 spaced above the top of the body 10.

In accordance with an important aspect of the invention, a device is provided to seal off over the body proximate the stem upper terminal, that device having a flexible upper portion exposed upwardly and projecting over that terminal. These relationships are such that the stem may be depressed by force transmission through the device to urge the stem and stopper downwardly for opening the valve. In the example shown, the device has the form of a cap or button 40 internally recessed at 44 to receive and fit the stepped head 38. The illustrated cap has a rounded top 40a, a cylindrical skirt 40b, and a stepped base flange 40c received in a correspondingly stepped annular recess 41 in the body.

An annular molded plastic retainer 42 threads on the body at 43 and clamps the base flange 40c, whereby the latter seals off against the body to block leakage of any fluid entering the space or recess 44 formed within the cap via clearance between bore 25 and stem 33a. Further, the cap then projects upwardly through the retainer for presentation as an easily actuable downwardly depressible push button. FIG. 1 shows the user's thumb 47 pressing downwardly on the push button cap, and finger 48 engaging the underside of an integrally molded sideward projection 49 on the body; in this regard, upward finger pressure balances or offsets downward thumb pressure. As the cap is depressed, the wall or skirt 40b deflects outwardly to accommodate any fluid trapped in space 44.

The cap may consist of any plastic material formable into flexible configuration, such as olefin polymers, particularly polymers of vinyl halides, particularly vinyl chloride, vinyl esters, particularly vinyl acetate, ethylene, propylene, styrene, acrylic acid and acrylic esters and copolymers of these monomers, and which are desirably organoleptically suitable. Seals 23 and 24 may also have such composition.

The body 10, stopper part 32a, stem 33 and duct 17 may be formed of any suitable rigid, molded plastic material such as polyethylene, polypropylene, polyoxymethylene, acrylonitrile-butadiene-styrene copolymer (ABS or Cycolac, for example) and rubber modified styrene polymers, organoleptically suitable.

In FIGS. 2 and 3, flow guides 50 project laterally inwardly and extend downwardly in the flow chamber 51 to guide draining liquid into a vertical non-splashing discharge stream 52 issuing from the outlet or mouth 12. FIG. 3 shows the flow arrows 53 extending downwardly and laterally through the opening 54 formed between the seat 27 and stopper 32, and then downwardly in the vertical spaces 55 formed between the circularly spaced flow guides or straighteners. The inner faces 50a of the guides may also be located as shown to closely confine the stopper periphery 56, as by slidable engagement therewith, to center the stopper during its downward and upward movement to open and close the valve. This functioning aids in reducing uneven discharge and consequent lateral splashing of the stream issuing from outlet 12. Note that the outer periphery of the O-ring 32b is inwardly spaced from the vertical cylinder defined by the stopper periphery 56, so as not to frictionally engage the inner faces 50a.

FIG. 1 also shows a cup 60 receiving the steady, non-splashing flow 52.

Finally, the screen 31 may also or alternatively be held in place by an internal ring 80 bonded to the inner wall of body section 10a. That ring aids in maintaining the discharge from outlet 12 in the form of a non-splashing stream.

I claim:

1. In a valve assembly,
   a. a valve body having a side inlet and a bottom outlet, there being a downwardly facing annular seat in the body through which fluid passes in flowing to the outlet,
   b. a stopper upwardly engageable against the seat and a stem carrying the stopper and projecting upwardly in the body, there being top flange structure on the stem,
   c. a coil spring urging the stem upwardly, said spring in its entirety extending about the stem above the level of the side inlet and directly below the top flange structure,
   d. a device sealing off over the body proximate the stem upper terminal and having a flexible upper portion exposed upwardly and projecting over the stem upper terminal, whereby said terminal may be depressed through said device to urge the stem and stopper downwardly for opening the valve, and
   e. there being an annular retainer on the body and retaining said device thereto, said device having the form of a cap projecting upwardly through the retainer and about the upper extent of the spring in order to project over the top flange structure on the stem for presentation as a downwardly depressible pushbutton.

2. The valve assembly of claim 1 wherein said cap consists of a flexible plastic material and said valve body consists of rigid molded plastic material.

3. The valve assembly of claim 2 wherein said stem and body form clearance through which fluid pressure may leak to the underside of the cap.

4. The valve assembly of claim 1 wherein said body forms a flow chamber between said stopper and outlet, there being guides projecting generally inwardly and downwardly in the chamber and from between which fluid drains in a vertical non-splashing discharge stream issuing from the outlet, said guides having vertically elongated inward terminals which extend closely about the stopper to center the stopper during its downward and upward movement.

5. The valve assembly of claim 4 wherein said guides project inwardly from the interior wall of the flow chamber.

6. The valve assembly of claim 1 including a sideward projection on the body to receive upward manual finger pressure when thumb pressure is exerted downwardly on said device upper portion.

7. The valve assembly of claim 1 including a water cooler receptacle supporting said body in water delivering relation with said inlet.

8. In a valve assembly,
   a. a valve body having a side inlet and a bottom outlet, there being a downwardly facing annular seat in the body through which fluid passes in flowing to the outlet,
   b. a stopper upwardly engageable against the seat and a stem carrying the stopper and projecting upwardly in the body,
   c. yieldable means urging the stem upwardly,
   d. a device sealing off over the body proximate the stem upper terminal and having a flexible upper portion exposed upwardly and projecting over the stem upper terminal, whereby said terminal may be depressed through said device to urge the stem and stopper downwardly for opening the valve,
   e. an annular retainer on the body and retaining said device thereto, said device having the form of a cap projecting upwardly through the retainer in order to project over the upper terminal of the stem for presentation as a downwardly depressible push button, and f. the stem including upper and lower sections having threaded interengagement characterized in that the stem length may be adjusted to control stopper displacement from the seat in response to downward depression of the cap.

* * * * *